US011912040B2

(12) United States Patent
Nakazawa et al.

(10) Patent No.: US 11,912,040 B2
(45) Date of Patent: Feb. 27, 2024

(54) REPLENISHABLE LIQUID STORAGE TANK INCLUDING BACKPRESSURE APPLICATION MEMBER, AND IMAGE-FORMING APPARATUS PROVIDED WITH THE SAME

(71) Applicant: Brother Kogyo Kabushiki Kaisha, Nagoya (JP)

(72) Inventors: Fumio Nakazawa, Okazaki (JP); Tsuyoshi Kuwayama, Kasugai (JP); Yoshinori Osakabe, Seto (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/562,601

(22) Filed: Dec. 27, 2021

(65) Prior Publication Data

US 2022/0118768 A1 Apr. 21, 2022

Related U.S. Application Data

(63) Continuation of application No. 16/805,264, filed on Feb. 28, 2020, now Pat. No. 11,225,084.

(30) Foreign Application Priority Data

Mar. 29, 2019 (JP) ................................ 2019-066702
Mar. 29, 2019 (JP) ................................ 2019-066703

(51) Int. Cl.
*B41J 2/175* (2006.01)

(52) U.S. Cl.
CPC ....... *B41J 2/17556* (2013.01); *B41J 2/17513* (2013.01)

(58) Field of Classification Search
None
See application file for complete search history.

(56) References Cited

U.S. PATENT DOCUMENTS

| | | | |
|---|---|---|---|
| 5,453,771 | A | 9/1995 | Waseda et al. |
| 5,682,189 | A | 10/1997 | Takagi |
| 6,186,621 | B1 | 2/2001 | Pew |
| 6,276,785 | B1 | 8/2001 | Shinada et al. |

(Continued)

FOREIGN PATENT DOCUMENTS

| | | |
|---|---|---|
| JP | H06-067034 U | 9/1994 |
| JP | H08-011320 A | 1/1996 |

(Continued)

OTHER PUBLICATIONS

Translation of JP 2010-125619 A. (Year: 2010).*

(Continued)

*Primary Examiner* — Justin Seo
(74) *Attorney, Agent, or Firm* — Banner & Witcoff, Ltd.

(57) ABSTRACT

A replenishing-type liquid storage tank includes a tank body, and a backpressure application member. Liquid is replenishable in the tank body and the tank body is configured to store the liquid therein. The backpressure application member is accommodated in the tank body to apply backpressure to the liquid stored in the tank body. The backpressure application member has a portion positioned equal to or higher than a liquid level of a maximum tolerable amount of the liquid storable in the tank body.

14 Claims, 16 Drawing Sheets

(56) References Cited

U.S. PATENT DOCUMENTS

| | | | |
|---|---|---|---|
| 6,390,611 B1 | 5/2002 | Kobayashi et al. | |
| 6,454,400 B1 | 9/2002 | Morita et al. | |
| 7,090,341 B1 | 8/2006 | Miyazawa | |
| 10,245,865 B2 | 4/2019 | Kudo et al. | |
| 10,286,676 B2 | 5/2019 | Kimura et al. | |
| 2003/0071881 A1 | 4/2003 | Toba et al. | |
| 2004/0090501 A1 * | 5/2004 | Yoshida | B41J 2/17513 347/85 |
| 2013/0321538 A1 | 12/2013 | Ishizawa et al. | |
| 2018/0272731 A1 | 9/2018 | Kimura et al. | |
| 2018/0272774 A1 | 9/2018 | Kudo et al. | |

FOREIGN PATENT DOCUMENTS

| | | |
|---|---|---|
| JP | H08-132635 A | 5/1996 |
| JP | 2002-264354 A | 9/2002 |
| JP | 2003-089221 A | 3/2003 |
| JP | 2003-312000 A | 11/2003 |
| JP | 2006-044214 A | 2/2006 |
| JP | 2006-082285 A | 3/2006 |
| JP | 2007-152857 A | 6/2007 |
| JP | 2008-247042 A | 10/2008 |
| JP | 2010-125619 A | 6/2010 |
| JP | 2010-208276 A | 9/2010 |
| JP | 2013-248777 A | 12/2013 |
| JP | 2018-161851 A | 10/2018 |
| JP | 2018-161852 A | 10/2018 |
| JP | 2019-025663 A | 2/2019 |

OTHER PUBLICATIONS

Translation of JP 2002-264354 A. (Year: 2002).*

Feb. 7, 2023—(JP) Notice of Reasons for Refusal—JP App 2019-066702, Eng Tran.

Feb. 7, 2023—(JP) Notice of Reasons for Refusal—JP App 2019-066703, Eng Tran.

Jun. 8, 2023—U.S. Notice of Allowance—U.S. Appl. No. 17/562,688.

* cited by examiner

REPLENISHABLE LIQUID STORAGE TANK INCLUDING BACKPRESSURE APPLICATION MEMBER, AND IMAGE-FORMING APPARATUS PROVIDED WITH THE SAME

CROSS REFERENCE TO RELATED APPLICATION

This Application is a Continuation of application Ser. No. 16/805,264 filed Feb. 28, 2020, which claims priority from Japanese Patent Application Nos. 2019-066702 filed Mar. 29, 2019 and 2019-066703 filed Mar. 29, 2019. The entire contents of the priority applications are incorporated herein by reference.

TECHNICAL FIELD

The present disclosure relates to a liquid storage tank to which liquid is replenishable, and to an image-forming device provided with the liquid storage tank.

BACKGROUND

There is a well-known ink jet printer provided with a liquid storage tank for storing a liquid such as ink, and configured to consume the liquid stored in the tank. As such a liquid storage tank, a refillable-type liquid storage tank is known in the art. For example, Japanese Patent Application Publication No. 2018-161851 discloses a replenishable liquid storage tank into which liquid is suitably replenishable.

In such conventional ink jet printers, application of backpressure, i.e., negative pressure, to the ink stored in the liquid storage tank is required to form a meniscus of ink at a tip end portion of a nozzle which does not perform ink ejection in order to prevent the ink from being leaked through the nozzle. Conventionally, a differential pressure regulating valve is available as means for applying backpressure to the ink stored in the liquid storage tank. The differential pressure regulating valve is configured to be opened and closed in accordance with the pressure difference between upstream side and downstream side of the valve. Opening and closing of the valve can control backpressure applied to the ink.

SUMMARY

However, the differential pressure regulating valve is positioned midway between the liquid storage tank and the nozzle in a liquid supply system for supplying the ink from the liquid storage tank and the nozzle. Hence, the ink supply system inevitably becomes bulky.

Instead of the differential pressure regulating valve, an ink absorber for absorbing ink may be provided in a liquid storage tank for applying backpressure to the ink in the liquid storage tank. In a case where such backpressure application is performed by means of an ink absorber, a sufficient backpressure may not be applied to the ink if a sufficient amount of ink is not absorbed in the absorber due to decrease in the amount of ink left in the liquid storage tank.

In view of the foregoing, it is an object of the present disclosure to provide a replenishable liquid storage tank and an image-forming device provided with the tank capable of applying a sufficient backpressure to liquid stored in the tank, yet obviating increase in size of the entire liquid supply system.

Another object of the disclosure is to provide a replenishable liquid storage tank provided with a liquid absorber as a backpressure application means and an image-forming apparatus including the tank capable of applying sufficient backpressure to the liquid stored in the tank, irrespective of decrease in residual amount of liquid in the tank.

In order to attain the above and other objects, according to one aspect, the disclosure provides a replenishing-type liquid storage tank including a tank body, a backpressure application member, and an upper limit indicator. Liquid is replenishable in the tank body and the tank body is configured to store the liquid therein. The backpressure application member is made from a material capable of absorbing liquid and is accommodated in the tank body to apply backpressure to the liquid stored in the tank body. The upper limit indicator is set in the tank body. The upper limit indicator is indicative of a liquid level of a maximum tolerable amount of the liquid that can be stored in the tank body. The backpressure application member has a portion positioned higher than the upper limit indicator.

According to another aspect, the disclosure provides an image-forming apparatus including: the above replenishing-type liquid storage tank; and a recording head configured to form an image on an image recording medium with the liquid supplied from the replenishing-type liquid storage tank.

According to still another aspect, the disclosure provides a replenishing-type liquid storage tank including a tank body, a backpressure application member, and a functional lower limit indicator. Liquid is replenishable in the tank body and the tank body is configured to store the liquid therein. The backpressure application member is made from a material capable of absorbing liquid and is accommodated in the tank body to apply backpressure to the liquid stored in the tank body. The functional lower limit indicator is set in the tank body. The functional lower limit indicator is indicative of a liquid level of a minimum amount of liquid required to be stored in the tank body for enabling the backpressure application member to apply backpressure to the liquid stored in the tank body. The backpressure application member has a lower end positioned at a height equal to or lower than the functional lower limit indicator.

According to still another aspect, the disclosure provides an image-forming apparatus including: the above replenishing-type liquid storage tank according to the still another aspect; and a recording head configured to form an image on an image recording medium with the liquid supplied from the replenishing-type liquid storage tank.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Figure 1:
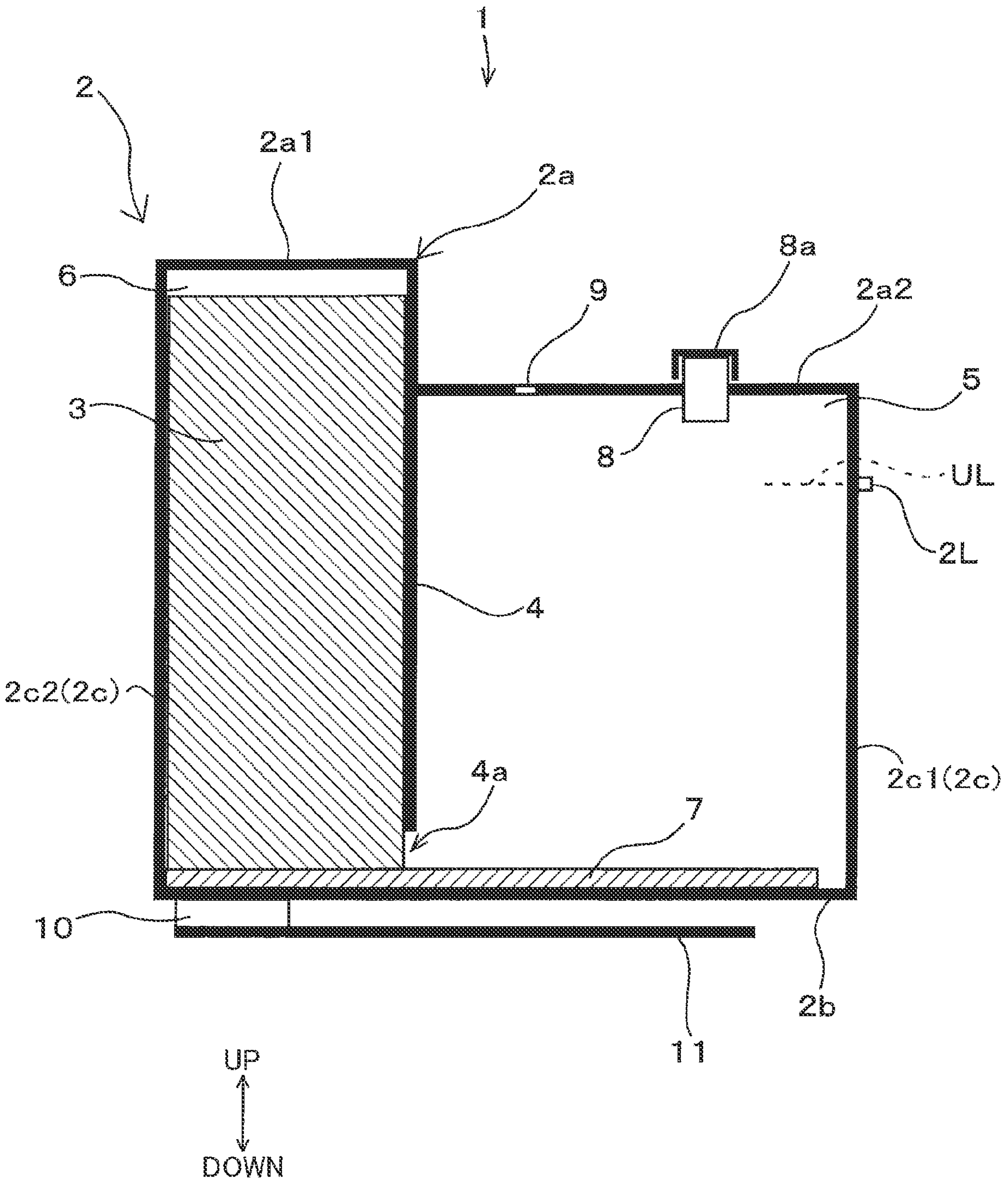
FIG. 1 is a schematic vertical cross-sectional view of a replenishing-type liquid storage tank according to a first embodiment.

First, an ink storage tank 1 as an example of a replenishing-type liquid storage tank according to a first embodiment of the disclosure will be described with reference to FIG. 1. The ink storage tank 1 is provided in an image-forming apparatus 100 (see FIG. 2). The ink storage tank 1 illustrated in FIG. 1 is in an operable posture thereof.

The tank 1 includes a tank body 2 constituting an outer shell of the tank 1, and a backpressure application member 3 positioned in an interior of the tank body 2. A partitioning wall 4 is provided in the interior of the tank body 2 to divide an internal space of the tank body 2 into an ink storage portion 5 and an absorber accommodating portion 6 for accommodating therein the backpressure application member 3. The ink storage portion 5 provides a space for storing ink therein.

The tank body 2 includes a flat bottom wall 2*b*, side walls 2*c*, and a top wall 2*a*. The side walls 2*c* include: a first side wall 2*c*1 extending upward from one end portion of the bottom wall 2*b*; and a second side wall 2*c*2 extending upward from another end portion of the bottom wall 2*b*. The top wall 2*a* extends to connect an upper end portion of the first side wall 2*c*1 to an upper end portion of the second side wall 2*c*2.

More specifically, the first side wall 2*c*1 functions as a wall constituting the ink storage portion 5, and the second side wall 2*c*2 functions as a wall constituting the absorber accommodating portion 6. The second side wall 2*c*2 has a length in an upward/downward direction greater than that of the first side wall 2*c*1. The top wall 2*a* the top wall 2*a* is in a stepped form and includes: a lower wall section 2*a*2 and a higher wall section 2*a*1 positioned higher than the lower wall section 2*a*2. The lower wall section 2*a*2 functions as a wall constituting the ink storage portion 5. The higher wall section 2*a*1 functions as a wall constituting the absorber accommodating portion 6. That is, an upper end of the absorber accommodating portion 6 is higher than an upper end of the ink storage portion 5. In other words, the absorber accommodating portion 6 has a length in the upward/downward direction greater than that of the ink storage portion 5.

The partitioning wall 4 extends linearly downward from the top wall 2*a* at a boundary between the ink storage portion 5 and the absorber accommodating portion 6. The partitioning wall 4 has a lower end positioned to be spaced away from the bottom wall 2*b* to provide a gap 4*a* therebetween. Hence, in the interior of the tank body 2, a lower portion of the ink storage portion 5 and a lower portion of the absorber accommodating portion 6 are in communication with each other through the gap 4*a*. The partitioning wall 4 is made from a liquid impermeable material.

An auxiliary absorber 7 is also positioned in the ink storage tank 1. The auxiliary absorber 7 extends horizontally over the ink storage portion 5 and the absorber accommodating portion 6 through the gap 4*a*. The auxiliary absorber 7 is positioned below the backpressure application member 3 and in contact with the backpressure application member 3 from below. The auxiliary absorber 7 is made from a liquid absorbing member such as an artificial sponge, a natural sponge, and a bundle of capillary tubes, and serves to help ink move from the ink storage portion 5 to the absorber accommodating portion 6.

Further, the ink storage tank 1 includes an ink inlet port 8. Ink is replenishable into the tank body 2 through the ink inlet port 8. In other words, the ink storage tank 1 is configured as a refillable ink storage tank into which ink can be refilled from an outside.

The ink inlet port 8 is provided at the lower wall section 2*a*2 of the top wall 2*a*. The ink inlet port 8 extends throughout a thickness of the lower wall section 2*a*2 in the upward/downward direction, and has a lower end positioned below the lower wall section 2*a*2. That is, the lower end of the ink inlet port 8 is positioned in the interior of the tank body 2. Specifically, the ink inlet port 8 has a tubular shape protruding into the interior of the tank body 2. Further, the ink inlet port 8 has an upper end portion protruding upward from the lower wall section 2*a*2. A cap 8*a* is attachable to and detachable from the upper end portion of the ink inlet port 8 for sealing the ink inlet port 8.

An air communication port 9 is formed in the lower wall section 2*a*2 of the top wall 2*a*. The air communication port 9 provides air communication between the interior and an exterior of the tank body 2.

An upper limit indicator UL is set in the ink storage tank 1. The upper limit indicator UL is a line indicating a maximum level of ink corresponding to a maximum tolerable amount of ink that can be stored in the tank body 2. In the present embodiment, the upper limit indicator UL is in a form of a rib 2L (a physically visible structure) protruding from the first side wall 2*c*1 to extend linearly in a horizontal direction therefrom. With this structure, a user can visually recognize the height of the rib 2L as being the upper limit of the ink (i.e., the height of the upper limit indicator UL).

Incidentally, instead of the rib 2L, a linear groove extending in the horizontal direction may be formed in the first side wall 2*c*1 as the upper limit indicator UL. Alternatively, a label directly printed on the first side wall 2*c*1 or a seal adhered to the first side wall 2*c*1 may also be available as the upper limit indicator UL. Still alternatively, a plurality of protruding dots or a plurality of dimpled dots those arrayed in line in the horizontal direction may be formed in the first side wall 2*c*1 as the upper limit indicator UL. In any case, the upper limit indicator UL should be positioned higher than a center of the tank body 2 in the upward/downward direction.

Further, the upper limit indicator UL is at a height equal to or lower than the lower end of the ink inlet port 8.

Incidentally, the tank body 2 has a window at a position coincident with or overlapped with the upper limit indicator UL. The window is formed of a transparent or translucent material so that the level of ink in the tank body 2 can be visually recognized through the window. Alternatively, the tank body 2 in its entirety may be made from a transparent or translucent material.

The gap 4*a* provided by the partitioning wall 4 and the bottom wall 2*b* is positioned lower than the rib 2L indicative of the upper limit indicator UL. In other words, the ink storage portion 5 and the absorber accommodating portion 6 are in communication with each other through the gap 4*a* positioned below the upper limit indicator UL (rib 2L).

The ink storage tank 1 is further provided with an ink outlet port 10 for discharging the ink stored in the tank body 2 to the outside thereof. The ink outlet port 10 is provided in the bottom wall 2*b*. Specifically, the ink outlet port 10 is formed in a portion of the bottom wall 2*b*, the portion constituting the absorber accommodating portion 6. Hence, the ink in the ink storage tank 1 can be supplied to a recording head 11 through the ink outlet port 10. Incidentally, the recording head 11 includes a plurality of nozzles through which ink is configured to be ejected to an image-forming medium such as a sheet to form an image on the medium.

Next, the backpressure application member 3 will be described in detail. The backpressure application member 3 is made from an absorbing material capable of absorbing ink. An artificial sponge, a natural sponge, a bundle of capillary tubes and other members capable of absorbing ink are available as the absorbing member. The backpressure application member 3 is configured to absorb, through the gap 4*a*, ink replenished into the tank body 2 through the ink inlet port 8. That is, the ink is initially absorbed into the lower portion of the backpressure application member 3, and then the absorbed ink is permeated upward in the backpressure application member 3.

Further, at least a part of the backpressure application member 3 (i.e., an upper portion of the backpressure application member 3 in the embodiment) is positioned higher than the upper limit indicator UL. Further, an upper end of the backpressure application member 3 is positioned above the lower end of the ink inlet port 8. Furthermore, the upper end of the backpressure application member 3 is positioned above the lower wall section 2*a*2 of the top wall 2*a*. Still further, the upper end of the backpressure application member 3 is positioned above the upper end portion of the ink inlet port 8.

In the interior of the tank body 2, the ink storage portion 5 and the partitioning wall 4 are positioned between the backpressure application member 3 and the ink inlet port 8. Hence, the ink inlet port 8 is provided so as not to make direct contact with the backpressure application member 3.

Figure 2:
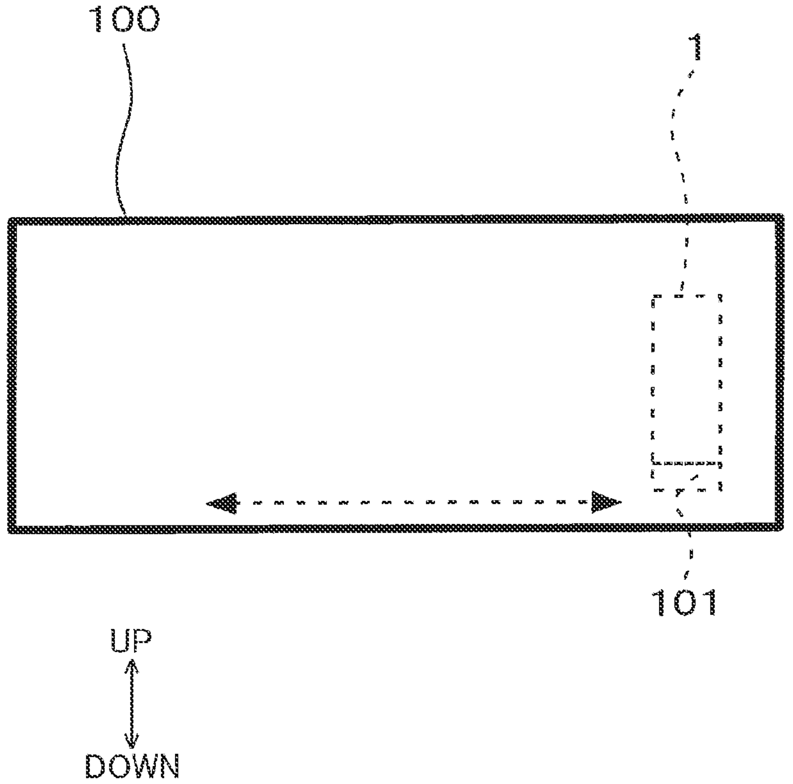
FIG. 2 is a schematic view illustrating an image-forming apparatus including the replenishing-type liquid storage tank according to the first embodiment.

As illustrated in FIG. 2, the ink storage tank 1 is provided in the image-forming apparatus 100, such as an ink jet printer. The image-forming apparatus 100 is a so-called on-carriage type printer in which the ink storage tank 1 is mounted on a carriage 101 reciprocally movable over an image-forming medium during image formation. Incidentally, the image-forming device 100 may be an off-carriage type printer in which the ink storage tank 1 is provided on a portion other than the carriage. Alternatively, the image-forming apparatus 100 may be a line printer in which a plurality of stationary image forming units are arrayed in line. Alternatively, the image-forming device 100 may be a type in which the ink storage tank 1 is detachable from and attachable to the apparatus, or may be a type where the ink storage tank 1 is fixedly secured to the apparatus. Further, the image-forming apparatus 100 may form images with liquid other than ink.

In the ink storage tank 1 according to the first embodiment, at least a portion of the backpressure application member 3, i.e., at least the upper portion of the backpressure application member 3 is positioned above the upper limit indicator UL. Therefore, the ink absorbed in the backpressure application member 3 is not likely to spread up to the upper portion, and accordingly, the backpressure application member 3 can have a portion where the ink is not absorbed. This means that ink absorbing function can still be exhibited in the backpressure application member 3 even if ink is refilled into the tank body 2 up to the level of the upper limit indicator UL. Consequently, sufficient backpressure can be securely and stably applied to the ink in the tank body 2.

Further, the backpressure application member 3 made from an ink absorbing material is remarkably simple in construction in comparison with the conventional differential pressure regulating valve. Therefore, increase in size of the ink supply system from the ink storage tank 1 to the nozzles of the recording head 11 can be obviated.

Further, also conventionally well-known is a backpressure generating structure by way of difference in height between an ink storage tank and an image-forming unit, i.e., a backpressure application structure utilizing water head difference. According to the structure utilizing the water head difference, the ink supply system becomes bulky because a certain level difference is required between the ink storage tank and the image-forming unit.

On the other hand, in the ink storage tank 1 according to the first embodiment, the backpressure application structure does not utilize water head difference, but employs the simple backpressure application member 3 made from an absorbing member. Hence, the ink storage tank 1 according to the embodiment is on a basis of a technology quite different from the conventional backpressure application structure utilizing water head difference.

Further, according to the ink storage tank 1, the upper end of the backpressure application member 3 is positioned higher than the lower end of the ink inlet port 8 positioned above the upper limit indicator UL. Hence, even if ink is excessively replenished in the tank body 2 beyond the upper limit indicator UL, a non-ink absorbing portion of the backpressure application member 3 is still likely to exist, and accordingly, backpressure can be stably and securely applied to the ink.

Further, according to the ink storage tank 1, the upper end of the backpressure application member 3 is positioned higher than the lower wall section 2*a*2 of the top wall 2*a* positioned above the lower end of the ink inlet port 8. Hence, even if ink is excessively replenished in the tank body 2 exceeding the upper limit indicator UL, a non-ink absorbing portion of the backpressure application member 3 may still exist, and accordingly, backpressure can be stably and securely applied to the ink.

Further, according to the ink storage tank 1, the upper end of the backpressure application member 3 is positioned higher than the upper end portion of the ink inlet port 8 positioned above the lower wall section 2*a*2. Hence, even if the ink is excessively replenished in the tank body 2 exceeding the upper limit indicator UL, a non-ink absorbing portion of the backpressure application member 3 still exists, and accordingly, backpressure can be stably and securely applied to the ink.

Further, according to the ink storage tank 1, the interior of the tank body 2 to which ink is replenished is divided into the ink storage portion 5 and the absorber accommodating portion 6 by the partitioning wall 4. With this structure, the partitioning wall 4 can restrain air contained in the ink storage portion 5 from directly contacting with the backpressure application member 3 accommodated in the absorber accommodating portion 6.

Further, in the tank body 2, the ink storage portion 5 and the absorber accommodating portion 6 are in communication with each other through the gap 4*a* formed by the partitioning wall 4. Therefore, the ink is allowed to move smoothly from the ink storage portion 5 to the absorber accommodating portion 6 despite the provision of the partitioning wall 4.

Further, according to the ink storage tank 1, the ink inlet port 8 is positioned at the top wall 2*a*, rather than at the side wall 2*c*. With this structure, the ink can be replenished into the tank body 2 from above, thereby facilitating ink replenishing labor. However, the ink inlet port 8 may be positioned at the side wall 2*c*. In the latter case, the ink inlet port 8 may be formed to have a slanted portion whose open end faces upward.

Various modifications are conceivable to the ink storage tank 1 of the first embodiment. Hereinafter, several modifications to the first embodiment will be described with reference to FIGS. 3 through 7. Like parts and components are designated by the same reference numerals as those of the first embodiment to avoid duplicating description.

Figure 3:
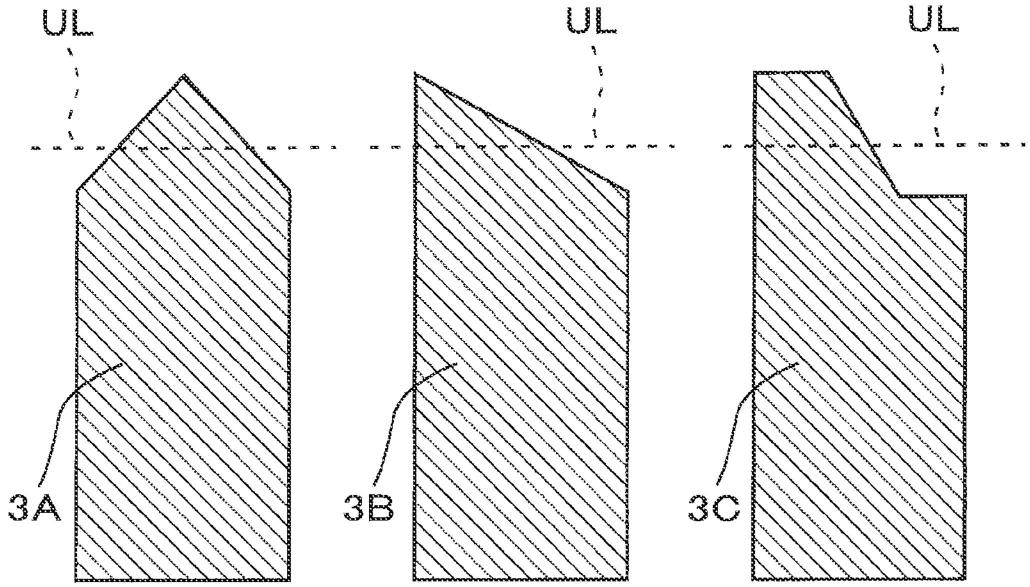
FIG. 3 is a schematic view illustrating various patterns of backpressure application members that can be used in the replenishing-type liquid storage tank according to the first embodiment.

FIG. 3 illustrates various modifications to the backpressure application member 3. Each of backpressure application members 3A, 3B and 3C shown in FIG. 3 has at least a portion positioned higher than the upper limit indicator UL. That is, as in the backpressure application members 3A-3C, the backpressure application member 3 may have various shapes, provided that the upper end portion thereof is positioned above the upper limit indicator UL.

Figure 4:
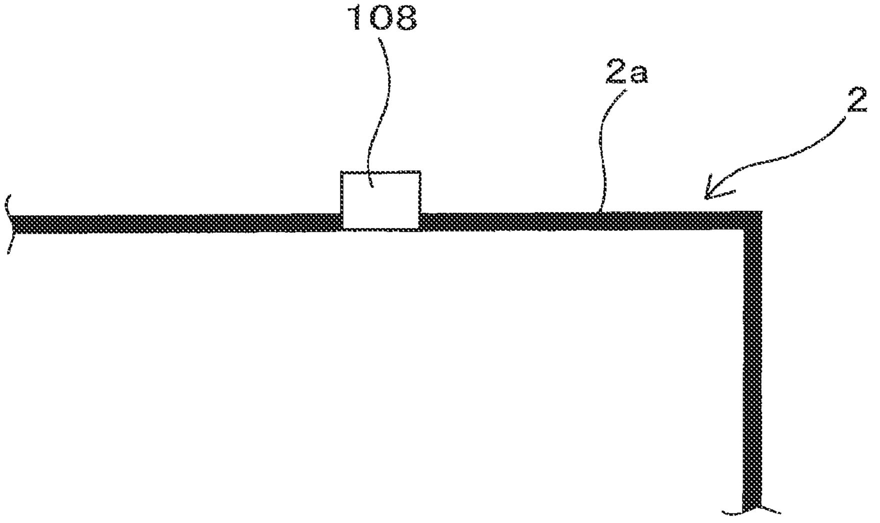
FIG. 4 is a schematic view illustrating a portion of a replenishing-type liquid storage tank according to a first modification to the first embodiment.

FIG. 4 depicts a replenishing-type ink storage tank according to a first modification to the first embodiment. This ink storage tank includes an ink inlet port 108 whose lower end does not protrude into an interior of the tank body 2 from the top wall 2*a*. In this case, the upper end portion of the backpressure application member 3 may be positioned higher than the lower end of the ink inlet port 108.

Figure 5:
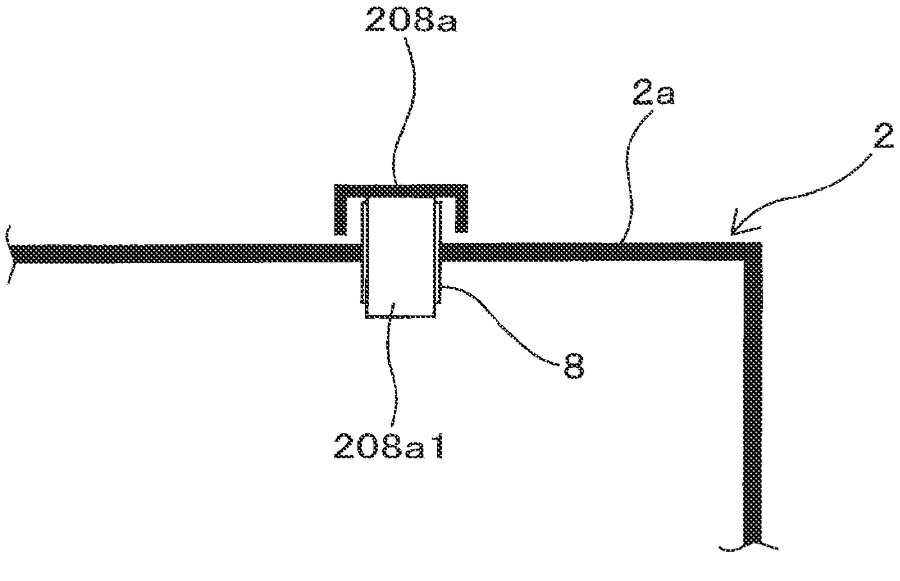
FIG. 5 is a schematic view illustrating a portion of a replenishing-type liquid storage tank according to a second modification to the first embodiment.

FIG. 5 illustrates a replenishing-type ink storage tank according to a second modification to the first embodiment. This ink storage tank includes a cap 208*a*, instead of the cap 8*a* of the first embodiment. The cap 208*a* includes a sleeve portion 208*a*1 insertable into the ink inlet port 8. The sleeve portion 208*a*1 has a lower end positioned lower than the lower end of the ink inlet port 8. Further, the upper end of the backpressure application member 3 is positioned higher than the lower end of the sleeve portion 208*a*1.

Figure 6:
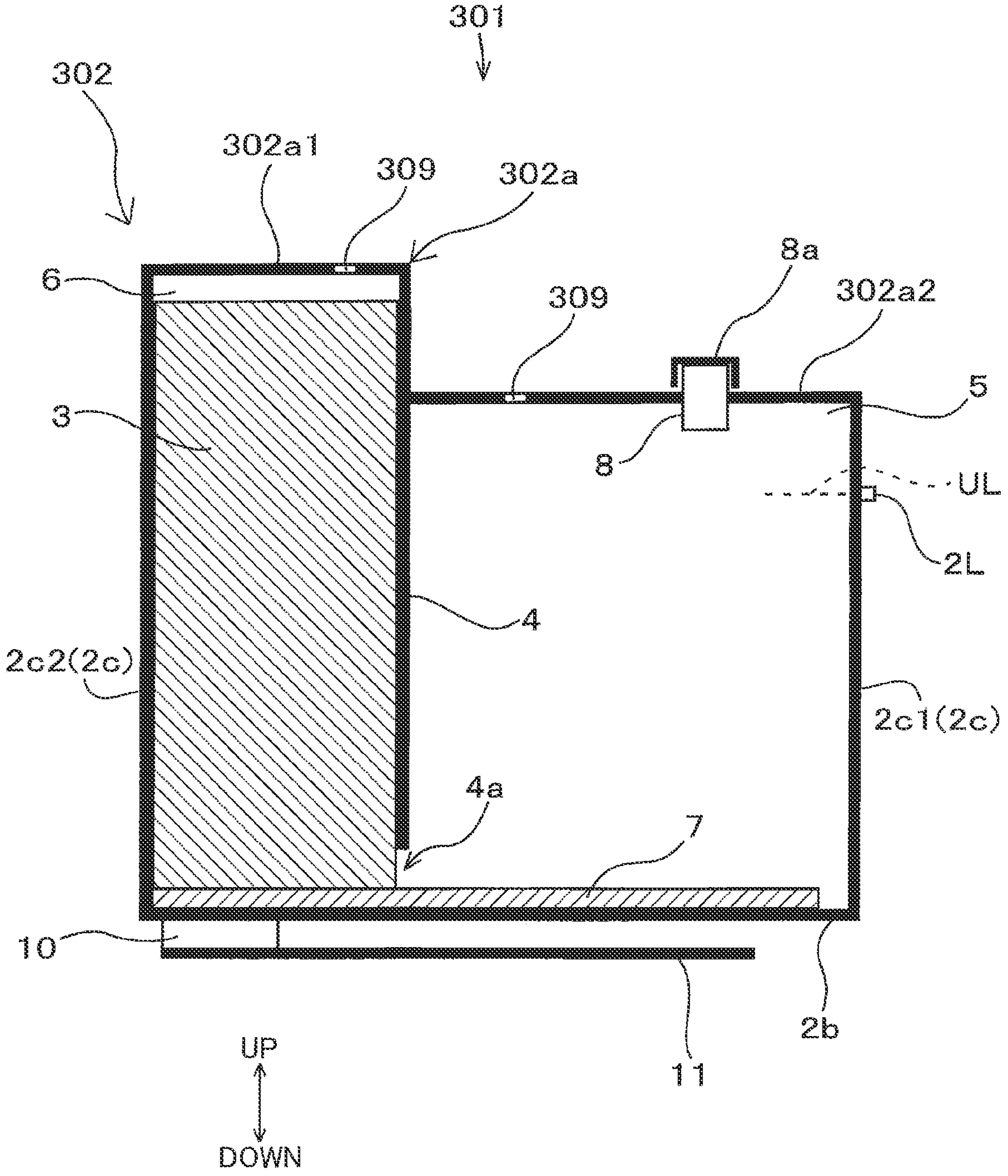
FIG. 6 is a schematic vertical cross-sectional view illustrating a replenishing-type liquid storage tank according to a third modification to the first embodiment.

FIG. 6 illustrates a replenishing-type ink storage tank 301 according to a third modification to the first embodiment. In this ink storage tank 301, two air communication ports 309 are formed one each in a higher wall section 302*a*1 of a top wall 302*a* of a tank body 302, and a lower wall section 302*a*2 of the top wall 302*a*. As a further modification, only the air communication port 309 may be provided at the higher wall section 302*a*1, while the air communication port 309 on the lower wall section 302*a*2 may be omitted.

Figure 7:
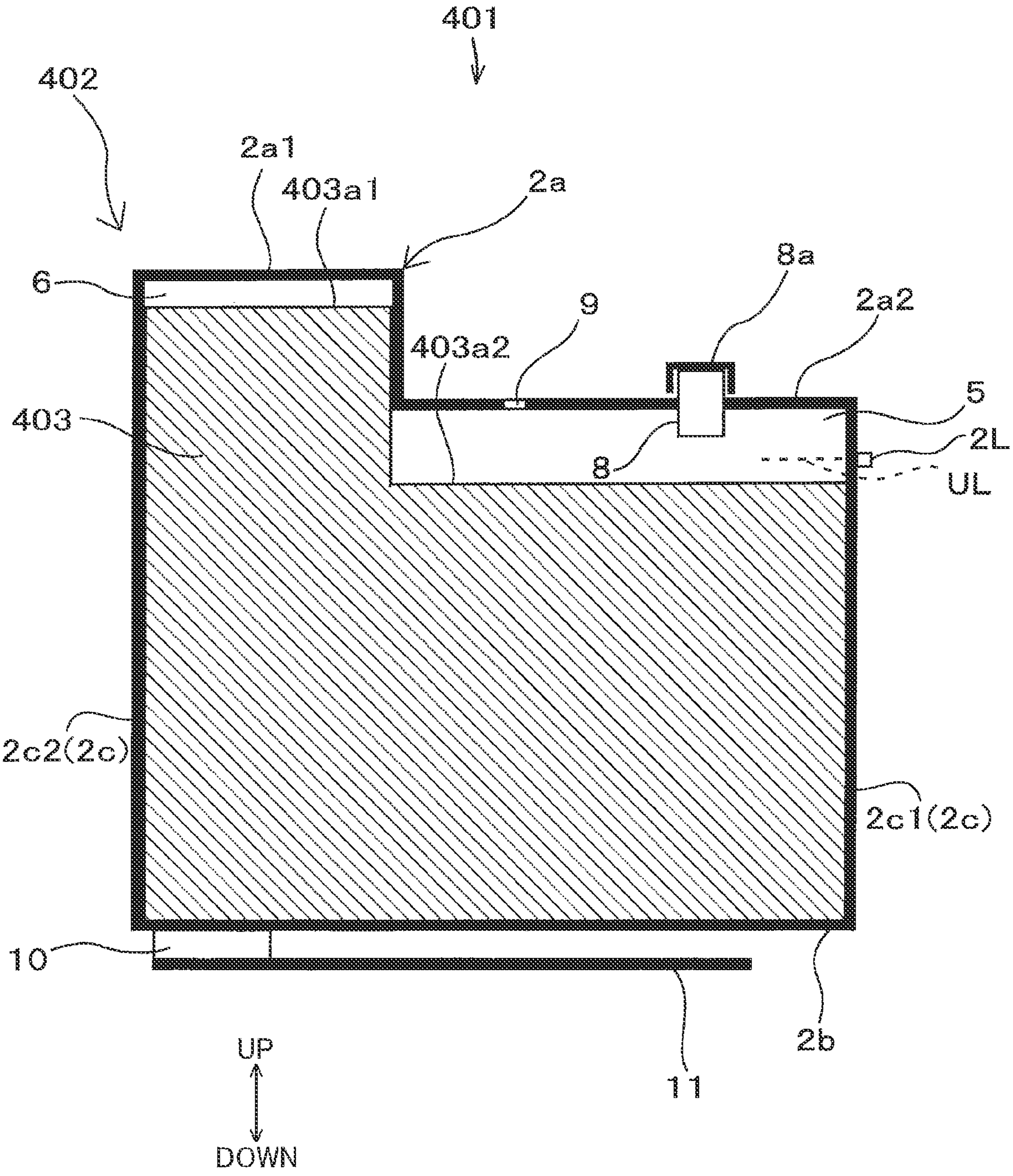
FIG. 7 is a schematic vertical cross-sectional view illustrating a replenishing-type liquid storage tank according to a fourth modification to the first embodiment.

A replenishing-type ink storage tank 401 according to a fourth modification is illustrated in FIG. 7. In a tank body 402 of the ink storage tank 401, the partitioning wall 4 is not provided, and a backpressure application member 403 is accommodated not only in the absorber accommodating portion 6 but also in the ink storage portion 5. Hence, the backpressure application member 403 has a stepped configuration having a higher level end 403*a*1 and a lower level end 403*a*2 lower than the higher level end 403*a*1. The upper limit indicator UL is positioned, at least, higher than the lower level end 403*a*2.

Incidentally, the ink inlet port 8 is positioned to be separated from the lower level end 403*a*2, so that the ink inlet port 8 does not make contact with the backpressure application member 403. Further, the auxiliary absorber 7 can be omitted. Further, the air communication port 9 may be formed in the higher wall section 2*a*1, instead of the lower wall section 2*a*2.

Incidentally, in the ink storage tank 1 including the partitioning wall 4, the air communication port 9 is preferably formed in the lower wall section 2*a*2 rather than the higher wall section 2*a*1. Further, in the ink storage tank 401 not having the partitioning wall 4, the air communication port 9 is preferably formed in the higher wall section 2*a*1 rather than the lower wall section 2*a*2. The ink storage tank 1 including the partitioning wall 4 and formed with the air communication port 9 in the lower wall section 2*a*2 is most preferable.

Next, a replenishing-type ink storage tank 501 according to a second embodiment will be described with reference to FIG. 8. Like parts and components are designated by the same reference numerals as those of the first embodiment to avoid duplicating description.

The ink storage tank 501 of the second embodiment is mounted on the carriage 101 of the image-forming apparatus 100 (see FIG. 2), in place of the ink storage tank 1 of the first embodiment.

As in the ink storage tank 1 of the first embodiment, the backpressure application member 3 and the auxiliary absorber 7 are accommodated in a tank body 502 of the ink storage tank 501 of the second embodiment. As in the first embodiment, the auxiliary absorber 7 is positioned below the backpressure application member 3 to be in contact therewith; and the auxiliary absorber 7 extends across the ink storage portion 5 and the absorber accommodating portion 6 through the gap 4*a*.

Figure 8:
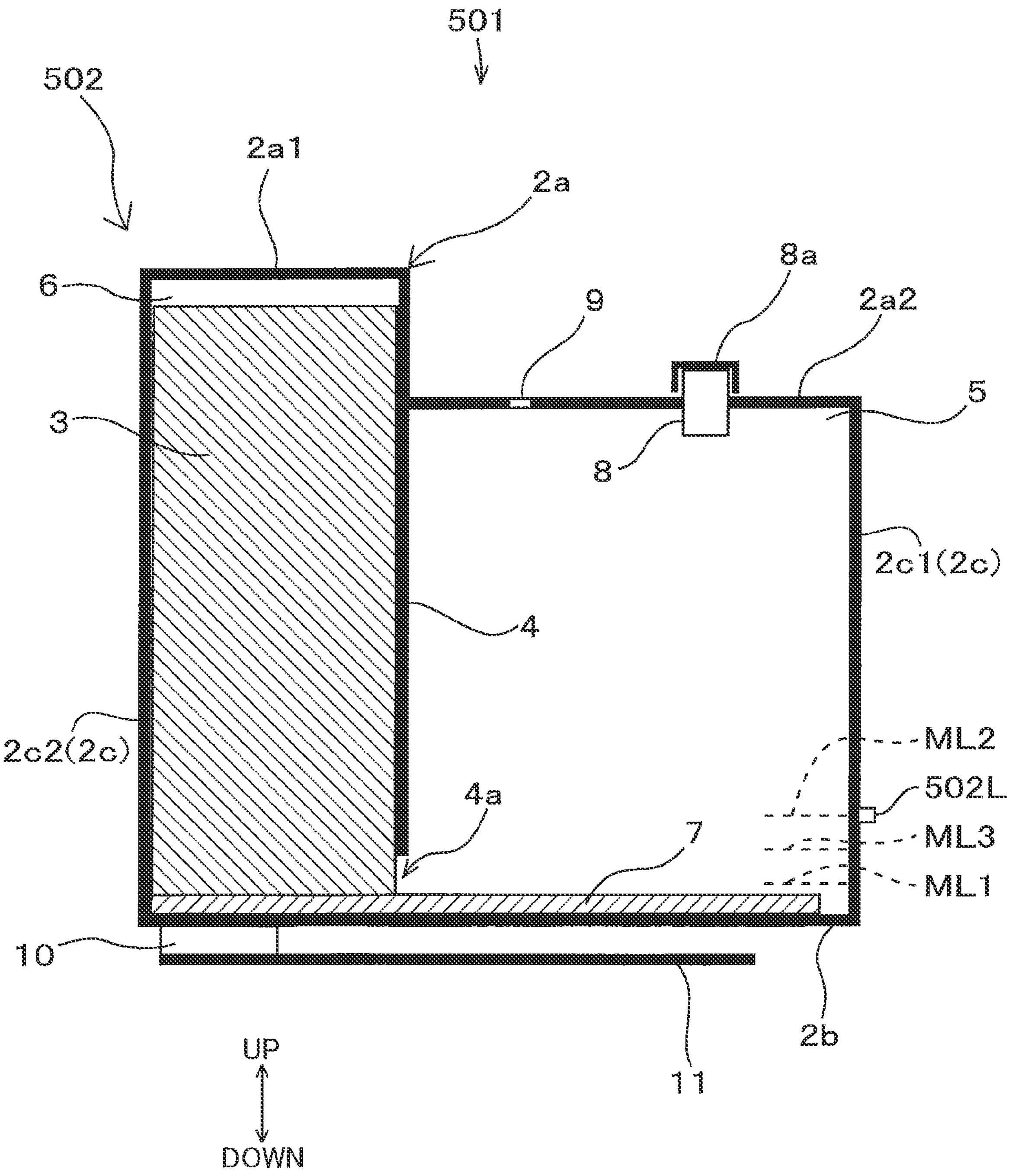
FIG. 8 is a schematic vertical cross-sectional view of a replenishing-type liquid storage tank according to a second embodiment.

Referring to FIG. 8, a functional lower limit indicator ML1 is set in the tank body 502 of the ink storage tank 501. The functional lower limit indicator ML1 is a line indicating a minimum level of ink corresponding to a minimum tolerable amount of ink that can be stored in the tank body 502 in order to maintain backpressure application function of the backpressure application member 3. The functional lower limit indicator ML1 is positioned lower than the center of the tank body 502 in the upward/downward direction. Further, the functional lower limit indicator ML1 is positioned higher than the bottom wall 2*b* of the tank body 502.

In the ink storage tank 501 of the second embodiment, at least a part of the backpressure application member 3 (lower end portion thereof) is at a height equal to or lower than the functional lower limit indicator ML1. More specifically, in the tank body 502, the functional lower limit indicator ML1 is positioned higher than the auxiliary absorber 7 and lower than the lower end of the partitioning wall 4 in the upward/downward direction, as illustrated in FIG. 8.

The lower end of the backpressure application member 3 is positioned at a height equal to or lower than a visual lower limit indicator ML2. The visual lower limit indicator ML2 is a line indicating a lowermost liquid level that allows user's visual inspection of the amount of ink stored in the tank body 502. The visual lower limit indicator ML2 is in a form of a physically visible rib 502L protruding from the first side wall 2*c*1 to extend in a horizontal direction. A user can visually recognize the height of the rib 502L as the visual lower limit indicator ML2 (the lower limit for user's visual inspection to the ink).

The ink storage portion 5 has a lower space lower than the rib 502L indicative of the visual lower limit indicator ML2, and the absorber accommodating portion 6 has a lower space lower than the rib 502L. The lower space of the ink storage portion 5 and the lower space of the absorber accommodating portion 6 are in communication with each other through the gap 4*a* between the partitioning wall 4 and the bottom wall 2*b*.

Incidentally, instead of the rib 502L, a linear groove extending in the horizontal direction may be formed in the first side wall 2*c*1 as the indicator of the visual lower limit indicator ML2. Alternatively, a label directly printed on the side wall 2*c* or a seal adhered to the first side wall 2*c*1 may also be available as the visual lower limit indicator ML2. Further alternatively, a plurality of protruding dots or a plurality of dimpled dots those arrayed in line in the horizontal direction may be formed in the first side wall 2*c*1 as the visual lower limit indicator ML2. The visual lower limit indicator ML2 may be in various forms, provided that the user can visually recognize a level of a prescribed amount of ink in the tank body 502 from the visual lower limit indicator ML2. In any case, the visual lower limit indicator ML2 is positioned higher than the functional lower limit indicator ML1. In other words, the functional lower limit indicator ML1 is positioned lower than the visual lower limit indicator ML2.

Incidentally, the tank body 502 has a window at a position coincident with or overlapped with the visual lower limit indicator ML2. The window is formed of transparent or translucent material so that the level of ink can be visually recognized through the window. Alternatively, the tank body 502 in its entirety may be made from transparent or translucent material.

Further, the lower end of the backpressure application member 3 is positioned at a height equal to or lower than a control lower limit indicator ML3. The control lower limit indicator ML3 is a line to be referred to by a computer to detect whether the residual amount of ink in the tank body 502 is minimum based on an amount of the ink ejected through the recording head 11. The control lower limit indicator ML3 linearly extends in the horizontal direction on the first side wall 2*c*1. The control lower limit indicator ML3 is positioned at a height higher than the functional lower limit indicator ML1 and lower than the visual lower limit indicator ML2. That is, the control lower limit indicator ML3 is positioned between the functional lower limit indicator ML1 and the visual lower limit indicator ML2. The functional lower limit indicator ML1 is lower than the control lower limit indicator ML3.

Incidentally, the control lower limit indicator ML3 may be higher than the visual lower limit indicator ML2. Further, a controller (not illustrated) controlling overall operations of the image-forming apparatus 100 may be available as the computer configured to refer to the control lower limit indicator ML3. A microcomputer is a main component of the controller, and is configured to count the amount of ink ejected from the nozzles of the recording head 11, and determine, on a basis of the counted value, whether the residual amount of ink in the tank body 502 is decreased to the level corresponding to the control lower limit indicator ML3.

In the ink storage tank 501 according to the second embodiment, at least a portion (lower end portion) of the backpressure application member 3 for applying backpressure to the ink stored in the tank body 502 is at the height equal to or lower than the functional lower limit indicator ML1. With this structure, even if the level of the residual ink remaining in the tank body 502 is decreased to a level corresponding to the functional lower limit indicator ML1, the lower end portion of the backpressure application member 3 can be kept immersed in the ink, so that the backpressure application member 3 can still absorb ink. Consequently, sufficient backpressure can be applied to the ink remaining in the tank body 502 even if the residual amount of ink therein is decreased.

Further, in the ink storage tank 501 according to the second embodiment, the functional lower limit indicator ML1 is positioned lower than the visual lower limit indicator ML2. With this structure, the user can visually recognize the decrease in the residual amount of ink in the tank body 502 before the residual amount of ink is lowered to the level corresponding to the functional lower limit indicator ML1. In other words, the decrease in the residual amount of ink to the level of the visual lower limit indicator ML2 can prompt the user to replenish ink into the tank body 502 at a suitable timing earlier than otherwise. Consequently, insufficient application of backpressure to the ink can be restrained.

Further, in the ink storage tank 501 according to the second embodiment, the functional lower limit indicator ML1 is positioned below the control lower limit indicator ML3. With this structure, the controller of the image-forming apparatus 100 can give a warning to the user to notify the decrease in residual amount of ink in the tank body 502 before the residual amount of ink is decreased to the level of the functional lower limit indicator ML1. Accordingly, the user can be prompted to perform replenishment of ink to the tank body 502 at an early stage, and hence, insufficient application of backpressure to the ink can be restrained.

Further, in the ink storage tank 501 according to the second embodiment, the functional lower limit indicator ML1 is positioned above an upper end of the ink outlet port 10, and higher than the lower end of the backpressure application member 3. Therefore, even if the residual amount of ink in the tank body 502 is decreased to the level of the functional lower limit indicator ML1, the ink in the tank body 502 is ensured to flow out of the ink outlet port 10 through at least one of the backpressure application member 3 and the auxiliary absorber 7.

Incidentally, if the functional lower limit indicator ML1 is positioned below the upper end of the ink outlet port 10, air is likely to be introduced directly into the ink outlet port 10, which may disable the nozzles of the recording head 11 for ejecting ink to possibly cause defective ink ejection. The ink storage tank 501 according to the second embodiment can avoid occurrence of such defective ink ejection.

Various modifications are also conceivable to the ink storage tank 501 of the second embodiment. Hereinafter, several modifications to the second embodiment will be described with reference to FIGS. 9 through 16.

Figure 9:
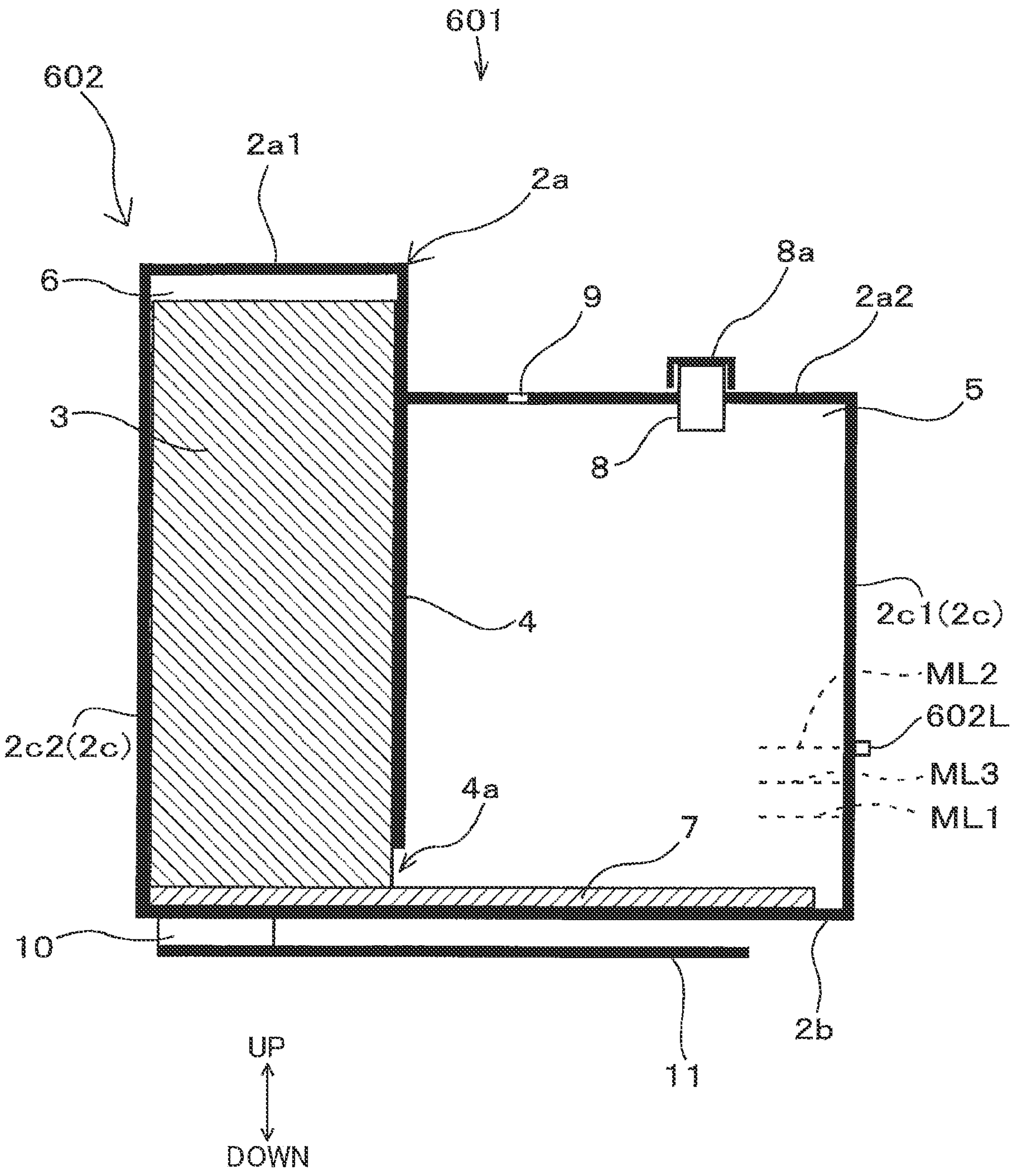
FIG. 9 is a schematic vertical cross-sectional view illustrating a replenishing-type liquid storage tank according to a first modification to the second embodiment.

FIG. 9 illustrates a replenishing-type ink storage tank 601 according to a first modification to the second embodiment. In the ink storage tank 601, the functional lower limit indicator ML1 is set at a height equal to or higher than the lower end of the partitioning wall 4. With this structure, even in a state where the residual amount of ink in a tank body 602 is decreased to the level of the functional lower limit indicator ML1, the gap 4*a* (functioning as an ink passage from the ink storage portion 5 to the absorber accommodating portion 6) can be filled with the ink. Hence, air is prevented from flowing from the ink storage portion 5 to the backpressure application member 3 accommodated in the absorber accommodating portion 6.

In the ink storage tank 601, the functional lower limit indicator ML1 is still lower than the visual lower limit indicator ML2 and the control lower limit indicator ML3, as in the second embodiment. A rib 602L provided on the first side wall 2*c*1 indicates the visual lower limit indicator ML2 of the tank body 602. The control lower limit indicator ML3 is positioned between the functional lower limit indicator ML1 and visual lower limit indicator ML2.

Figure 10:
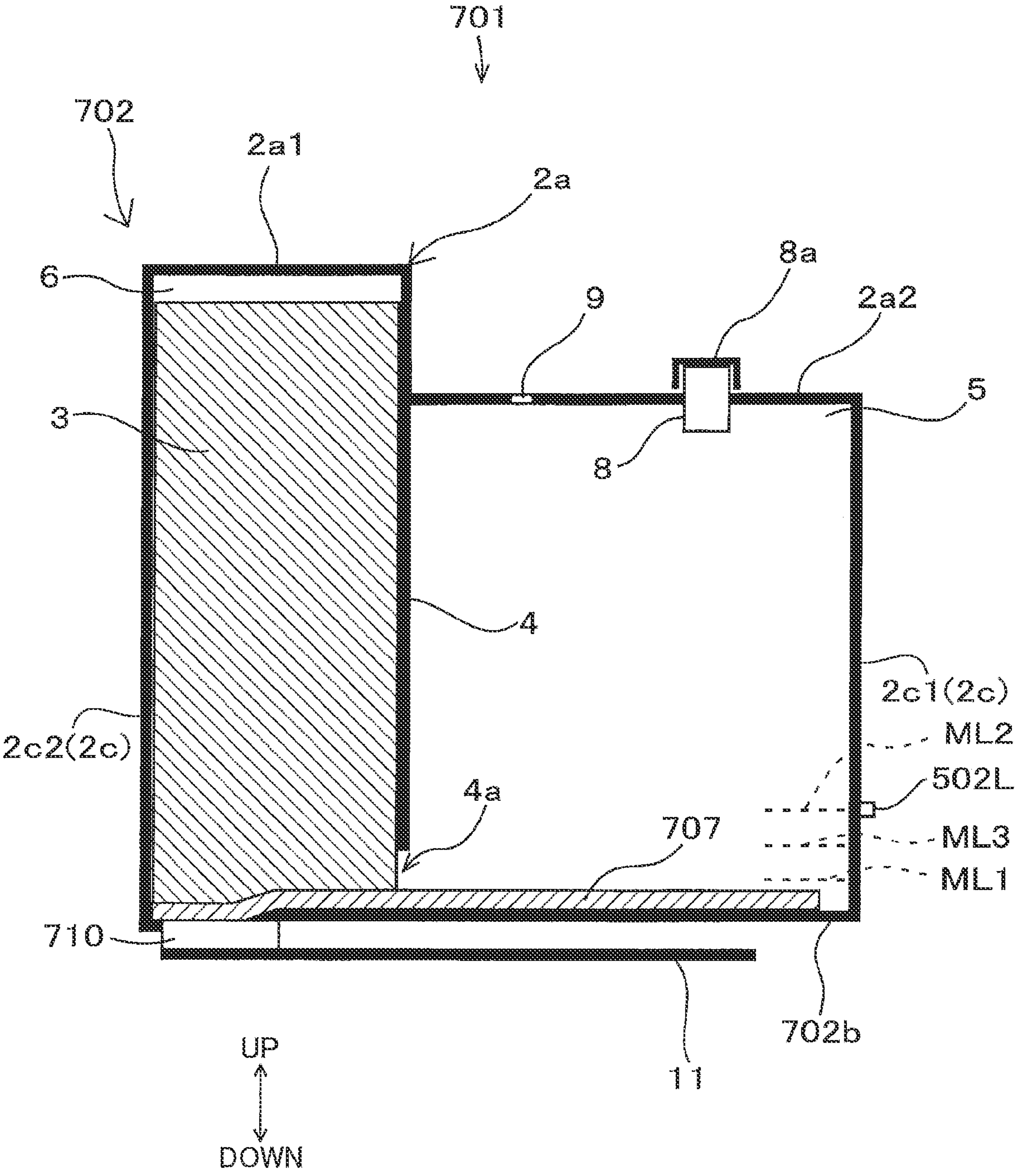
FIG. 10 is a schematic vertical cross-sectional view illustrating a replenishing-type liquid storage tank according to a second modification to the second embodiment.

FIG. 10 illustrates a replenishing-type ink storage tank 701 according to a second modification to the second embodiment. A tank body 702 includes a bottom wall 702*b* at which an ink outlet port 710 is provided. An upper surface of the ink outlet port 710 (a surface facing an auxiliary absorber 707 disposed along the bottom wall 702*b*) has a portion in direct contact with the auxiliary absorber 707. That is, the auxiliary absorber 707 has a part directly exposed to one end (upper end) of the ink outlet port 710 through the bottom wall 702*b* of the tank body 702.

Figure 11:
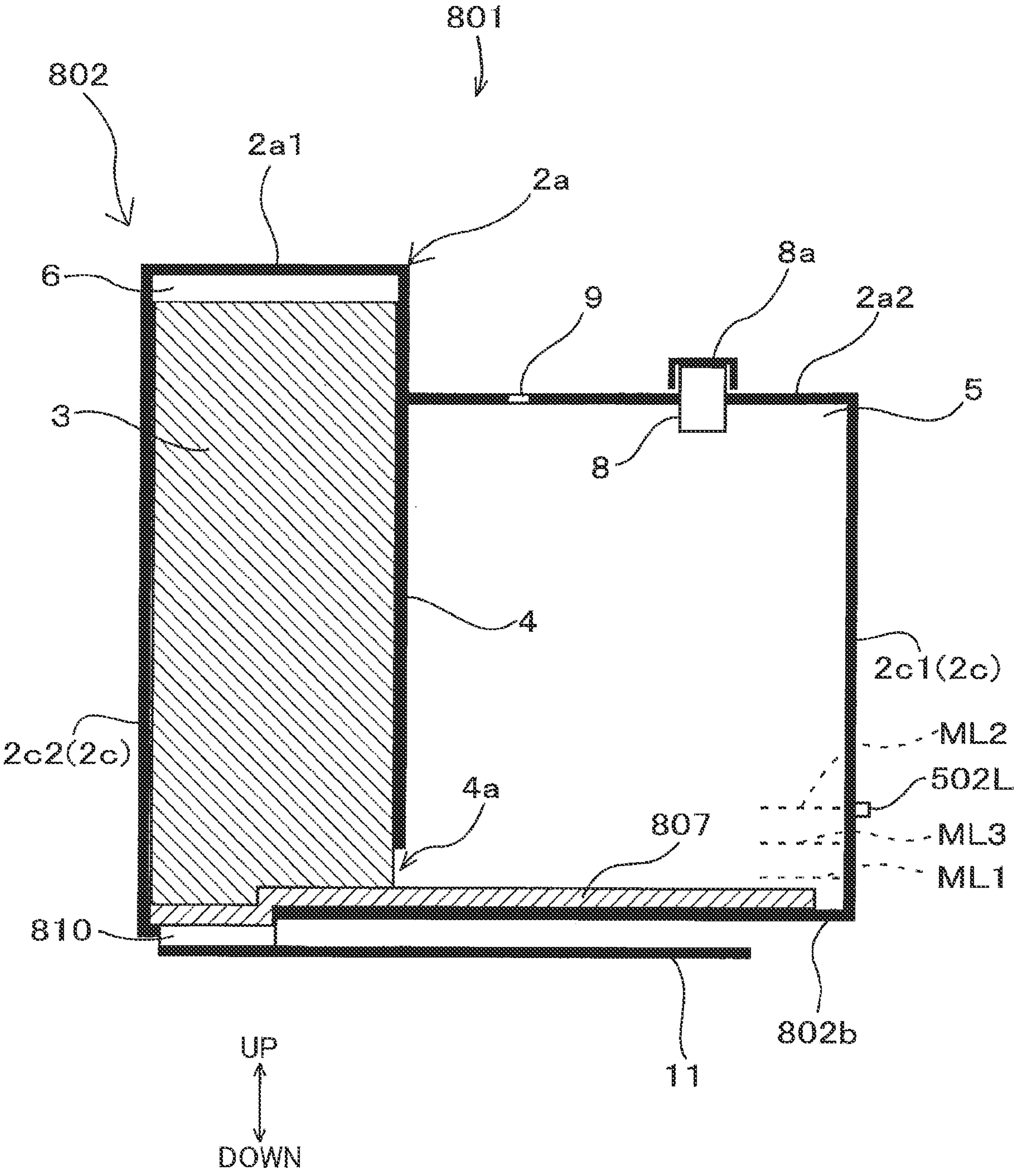
FIG. 11 is a schematic vertical cross-sectional view illustrating a replenishing-type liquid storage tank according to a third modification to the second embodiment.

FIG. 11 illustrates a replenishing-type ink storage tank 801 according to a third modification to the second embodiment. A tank body 802 includes a bottom wall 802*b* at which an ink outlet port 810 is provided. An entire one end of the ink outlet port 810 facing an auxiliary absorber 807 (entire upper surface of the ink outlet port 810) is in direct contact with the auxiliary absorber 807. The auxiliary absorber 807 has a portion protruding downward through the bottom wall 802*b*.

Figure 12:
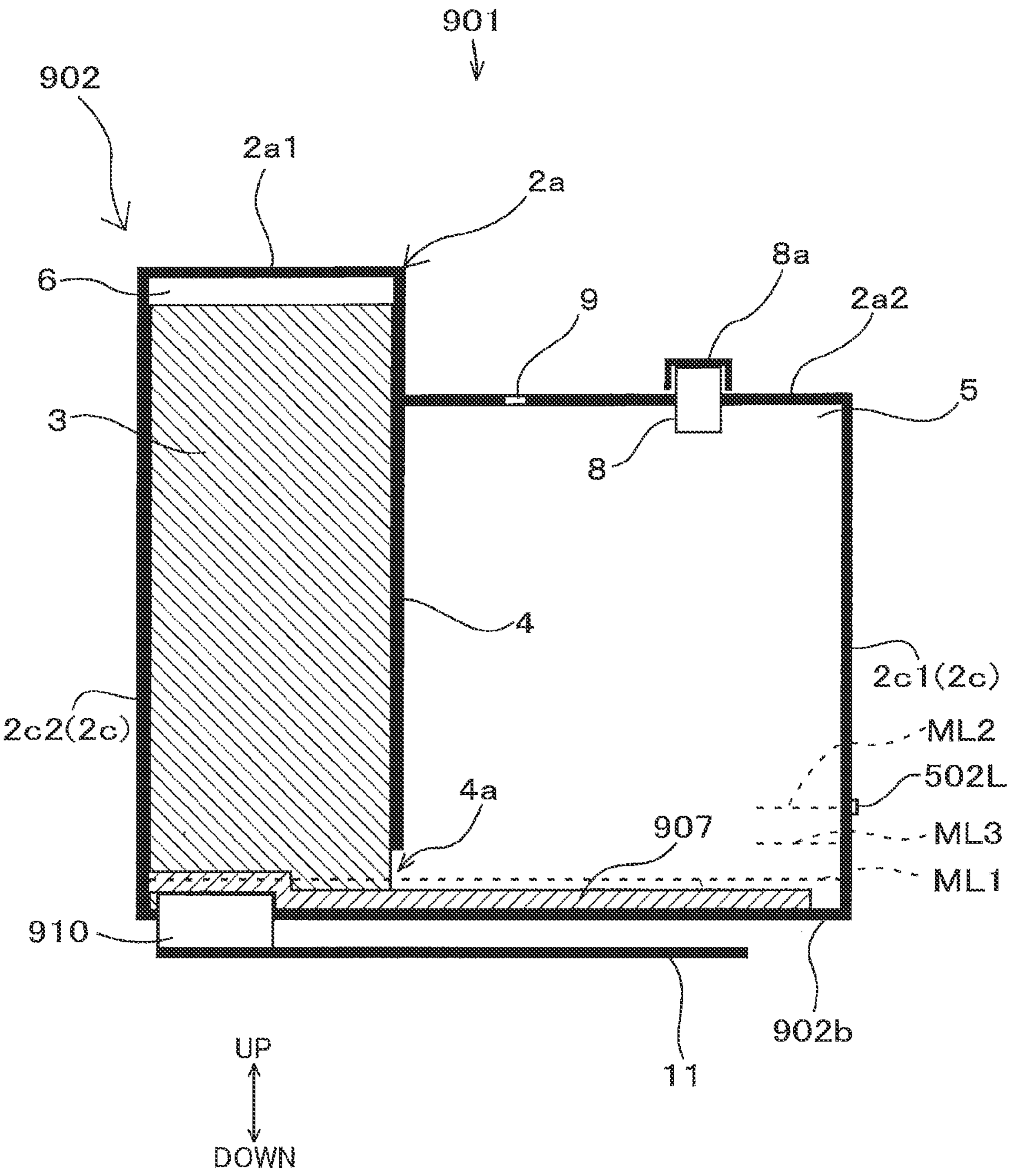
FIG. 12 is a schematic vertical cross-sectional view illustrating a replenishing-type liquid storage tank according to a fourth modification to the second embodiment.

Likewise, FIG. 12 illustrates a replenishing-type ink storage tank 901 according to a fourth modification to the second embodiment. A tank body 902 includes a bottom wall 902*b* at which an ink outlet port 910 is provided. An entire one end of the ink outlet port 910 facing an auxiliary absorber 907 (entire upper surface of the ink outlet port 910) is in direct contact with the auxiliary absorber 907. The auxiliary absorber 907 has a portion stepped upward, and the entire one end of the ink outlet port 910 is in contact with the stepped portion of the auxiliary absorber 907.

The ink storage tanks 801 and 901 may be applied with various modifications, as long as the ink in the tank bodies 802, 902 passes through the auxiliary absorbers 807, 907 without fail before flowing out of the respective tank bodies 802, 902 through the respective ink outlet ports 810, 910.

Incidentally, in the ink storage tanks 801 and 901, the ink outlet port 810, 910 may be arranged to face at least one of the backpressure application member 3 and the auxiliary absorber 807, 907. Specifically, in a case where the one end of the ink outlet port 810, 910 faces the backpressure application member 3, an entirety or a part of the one end (upper surface) of the ink outlet port 810, 910 may be in direct contact with the backpressure application member 3. In a case where the one end of the ink outlet port 810, 910 faces both of the auxiliary absorber 807, 907 and the backpressure application member 3, a part or an entirety of the one end (upper surface) of the ink outlet port 810, 910 may be in direct contact with each of the auxiliary absorber 807, 907 and the backpressure application member 3. That is, the ink storage tanks 801 and 901 may be applied with various modifications, provided that the liquid in the tank body 802, 902 is required to pass through at least one of the backpressure application member 3 and the auxiliary absorber 807, 907 before flowing out of the tank body 802, 902 through the ink outlet port 810, 910, respectively.

Figure 13:
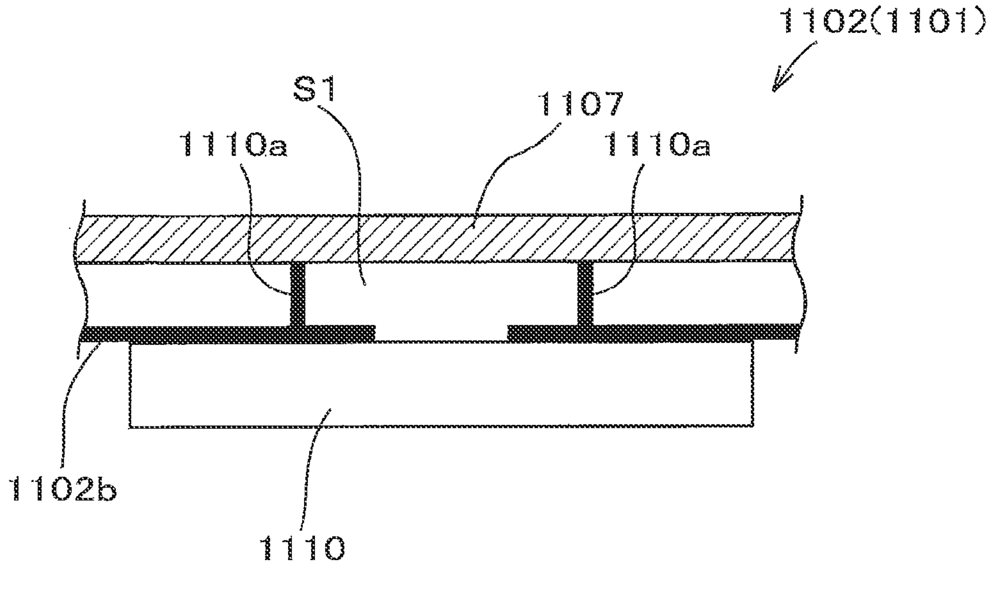
FIG. 13 is a schematic view illustrating a portion of a replenishing-type liquid storage tank according to a fifth modification to the second embodiment.
Figure 14:
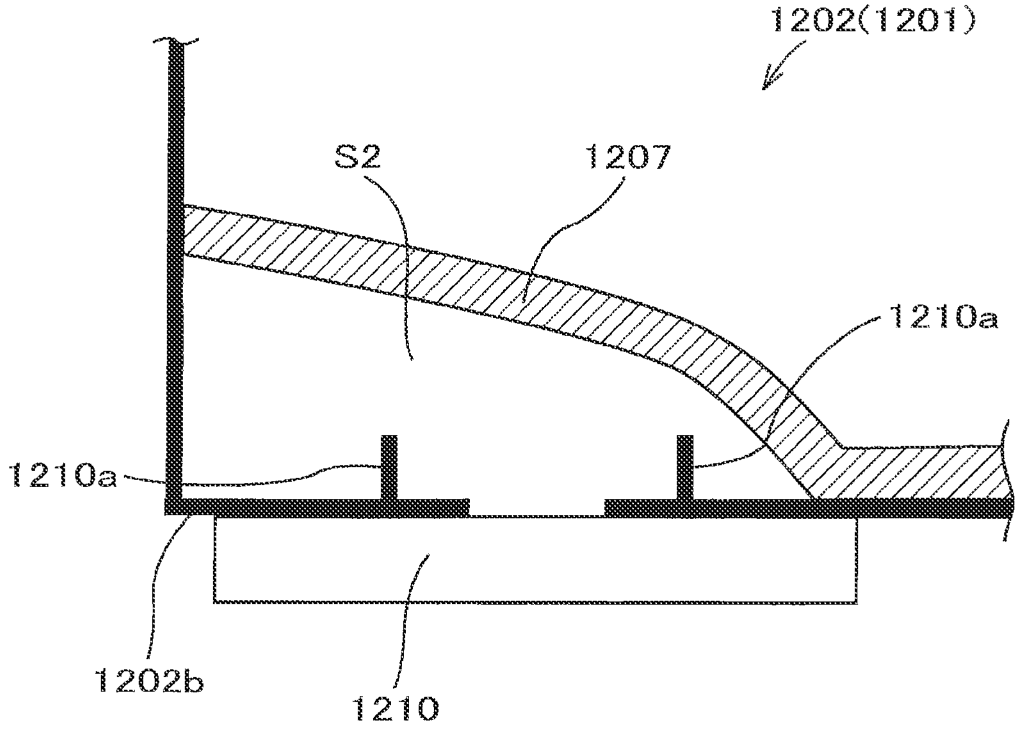
FIG. 14 is a schematic view illustrating a portion of a replenishing-type liquid storage tank according to a sixth modification to the second embodiment.

FIGS. 13 and 14 illustrate replenishable ink storage tanks 1101, 1201 according to fifth and sixth modifications to the second embodiment, respectively. In the ink storage tanks 1101 and 1201, ink outlet ports 1110 and 1210 are out of contact with auxiliary absorbers 1107, 1207, respectively, provided that ink in respective tank bodies 1102 and 1202 is ensured to pass through the corresponding auxiliary absorbers 1107 and 1207 to flow out of the tank bodies 1102, 1202 through the ink outlet ports 1110 and 1210.

Specifically, according to the ink storage tank 1101 illustrated in FIG. 13, a rib 1110*a* protrudes into the interior of the tank body 1102 from a bottom wall 1102*b* thereof at a position upstream of the ink outlet port 1110 in a flowing direction of the ink (downward in FIG. 13). The auxiliary absorber 1107 is supported by the rib 1110*a* such that the auxiliary absorber 1107 is in contact with the rib 1110*a*. A closed space S1 is defined by the rib 1110*a* and the auxiliary absorber 1107. With this structure, the ink in the tank body 1102 is required to pass through the auxiliary absorber 1107 before flowing out of the tank body 1102 through the ink outlet port 1110.

According to the ink storage tank 1201 illustrated in FIG. 14, a rib 1210*a* protrudes into the interior of the tank body 1202 from a bottom wall 1202*b* thereof at a position upstream of the ink outlet port 1210 in the flowing direction of the ink (downward in FIG. 14). The auxiliary absorber 1207 has an end face in contact with an inner surface of the tank body 1202, such that a part of the auxiliary absorber 1207 is separated from the rib 1210*a*. A closed space S2 is defined by the inner surface of the tank body 1202 and the auxiliary absorber 1207. With this structure, the ink in the tank body 1202 needs to pass through the auxiliary absorber 1207 before flowing out of the tank body 1202 through the ink outlet port 1210.

Incidentally, the ink outlet port 1210 may directly face the backpressure application member 3 with a space therebetween, rather than with the auxiliary absorber 1207, provided that the backpressure application member 3 is in contact with the inner surface of the tank body 1202 to define a closed space corresponding to the closed space S2 with the inner surface of the tank body 1202.

In other words, one end of the ink outlet port 1210 facing at least one of the backpressure application member 3 and the auxiliary absorber 1207 (i.e., an upper end of the ink outlet port 1210) may be arranged to be separated from the one of the backpressure application member 3 and auxiliary absorber 1207, provided that the one of the backpressure application member 3 and the auxiliary absorber 1207 is in contact with the inner surface of the tank body 1202 to define a closed space corresponding to the closed space S2 with the inner surface of the tank body 1202.

Figure 15:
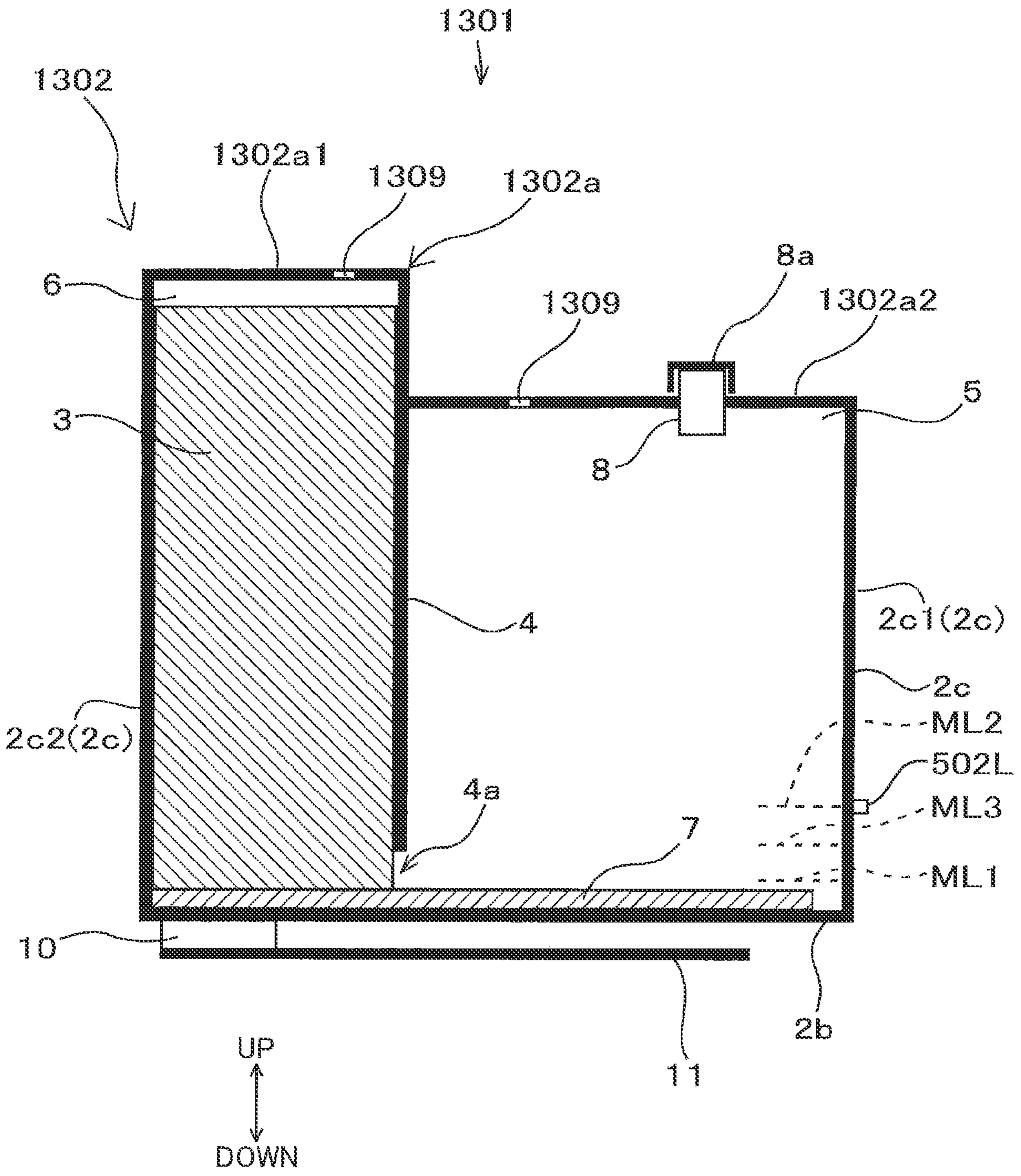
FIG. 15 is a schematic vertical cross-sectional view illustrating a replenishing-type liquid storage tank according to a seventh modification to the second embodiment.

FIG. 15 illustrates a replenishing-type ink storage tank 1301 according to a seventh modification to the second embodiment. In this ink storage tank 1301, two air communication ports 1309 are formed one each in a higher wall section 1302$a$1 and a lower wall section 1302$a$2 of a top wall 1302$a$ of a tank body 1302, as in the third modification to the first embodiment illustrated in FIG. 6. Alternatively, only one air communication port 1309 may be formed in one of the higher wall section 1302$a$1 and the lower wall section 1302$a$2 of the top wall 1302$a$.

Figure 16:
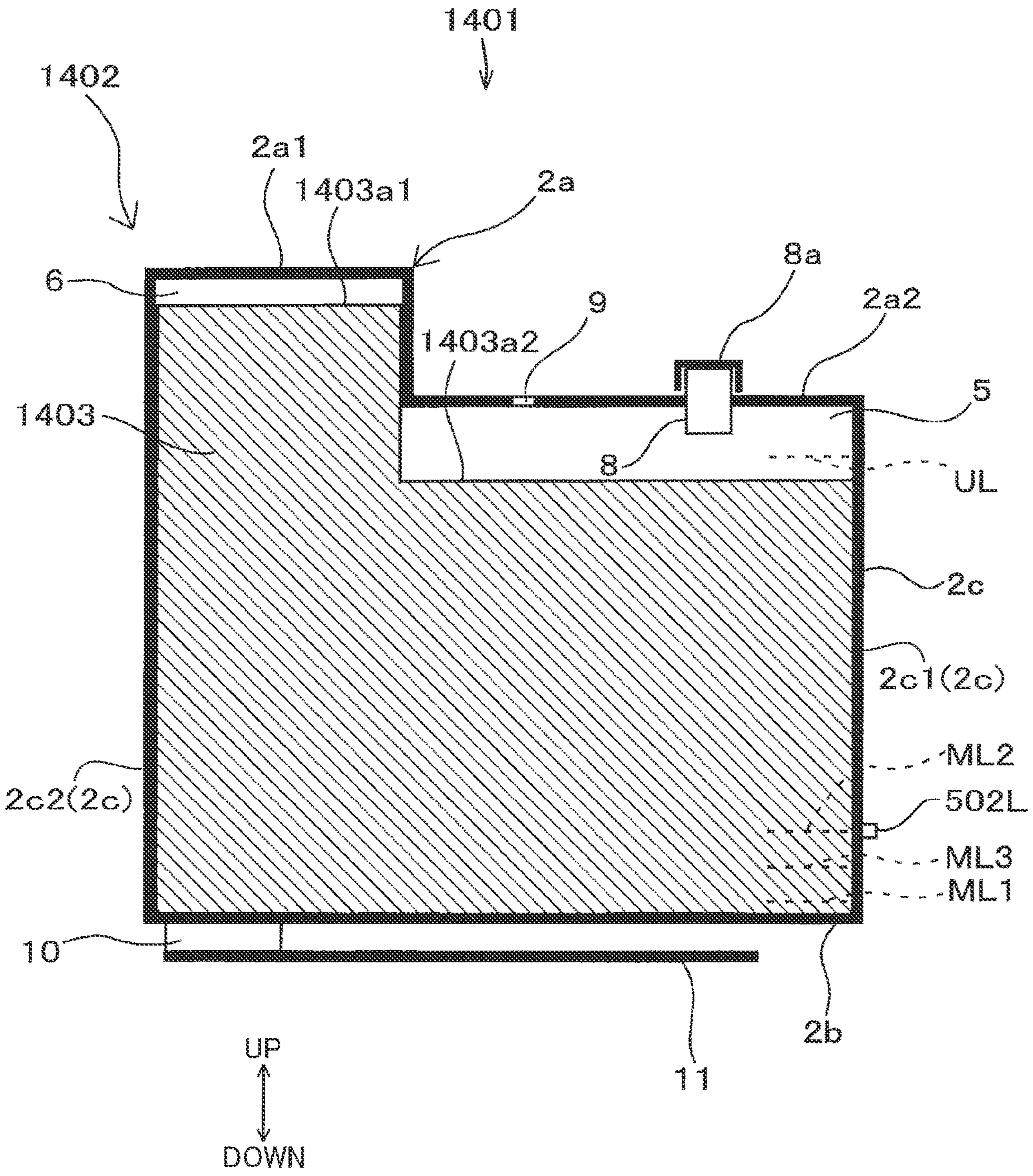
FIG. 16 is a schematic vertical cross-sectional view illustrating a replenishing-type liquid storage tank according to an eight modification to the second embodiment.

FIG. 16 illustrates a replenishing-type ink storage tank 1401 according to an eighth modification to the second embodiment. Similar to the fourth modification to the first embodiment illustrated in FIG. 7, the partitioning wall 4 is not provided in a tank body 1402 of the ink storage tank 1401. A backpressure application member 1403 is accommodated in the tank body 1402 to extend across the absorber accommodating portion 6 and the ink storage portion 5. Specifically, the backpressure application member 1403 has a stepped configuration as in the backpressure application member 403 of FIG. 7. That is, the backpressure application member 1403 has a portion having a higher level end 1403$a$1; and another portion having a lower level end 1403$a$2 lower than the higher level end 1403$a$1. The portion having the higher level end 1403$a$1 is accommodated in the absorber accommodating portion 6, and the portion having the lower level end 1403$a$2 is accommodated in the ink storage portion 5. The functional lower limit indicator ML1 is at a height equal to or higher than a lower end of the entire backpressure application member 1403. That is, the auxiliary absorber 7 of the second embodiment is not provided in the tank body 1402. Further, the ink inlet port 8 is positioned to be in separation from the lower level end 1403$a$2 of the backpressure application member 1403.

Incidentally, in the ink storage tank 1401, the air communication port 9 may be provided in the higher wall section 2$a$1 of the top wall 2$a$, rather than in the lower wall section 2$a$2 of the top wall 2$a$. In the ink storage tank 1401 without the partitioning wall 4, the air communication port 9 is preferably formed in the higher wall section 2$a$1 rather than in the lower wall section 2$a$2. However, the ink storage tank 501 including the partitioning wall 4 and having the air communication port 9 formed in the lower wall section 2$a$2 is most preferable.

Still further, while the backpressure application member 3 of the first and second embodiments is a one-piece component, the backpressure application member 3 may be provided by aggregation of a plurality of backpressure applying blocks. In the latter case, the backpressure applying blocks may have liquid absorbing performance different from one another in order to adjust liquid absorbing performance, i.e., backpressure application performance of the aggregated blocks. Particularly, the plurality of backpressure applying blocks may be stacked one after another so that the liquid absorbing performance of a lower block is higher than that of a higher block, i.e., the liquid absorbing performance of the higher block is lower than that of the lower block. With this structure, the backpressure application member 3 as a whole (aggregated blocks) has an upper portion where liquid absorbing performance is relatively lower, preventing the absorbed ink from spreading to the backpressure application member 3 in its entirety. Hence, the backpressure application function of the overall backpressure application member 3 is prevented from being lowered or vanished.

The above-described embodiments and modifications thereto may be combined with one another, as appropriate, in order to obtain the same technical and operational advantages.

While the description has been made in detail with reference to the specific embodiment, it would be apparent to those skilled in the art that various changes and modifications may be made therein without departing from the scope of the above described embodiment.

Remarks

The ink storage tanks 1, 301, 401, 501, 601, 701, 801, 901, 1101, 1201, 1301 and 1401 are examples of a replenishing-type liquid storage tank. The tank bodies 2, 302, 402, 502, 602, 702, 802, 902, 1102, 1202, 1302 and 1402 are examples of a tank body. The backpressure application members 3, 3A-3C, 403 and 1403 are examples of a backpressure application member. The auxiliary absorbers 7, 707, 807, 907, 1107 and 1207 are examples of an auxiliary absorber. The ink inlet ports 8 and 108 are examples of a liquid inlet port. The ink outlet ports 10, 710, 810, 910, 1110 and 1210 are examples of a liquid outlet port. The partitioning wall 4 is an example of a partitioning wall. The ink storage portion 5 is an example of a liquid storage portion. The absorber accommodating portion 6 is an example of an absorber accommodating portion. The upper limit indicator UL (rib 2L) is an example of an upper limit indicator. The functional lower limit indicator ML1 is an example of a functional lower limit indicator. The visual lower limit indicator ML2 (ribs 502L, 602L) is an example of a visual lower limit indicator. The control lower limit indicator ML3 is an example of a control lower limit indicator.

What is claimed is:

1. A replenishing-type liquid storage tank comprising:

a tank body in which liquid is replenishable and configured to store the liquid therein; and a backpressure application member accommodated in the tank body to apply backpressure to the liquid stored in the tank body, wherein the tank body defines therein a liquid storage portion configured to store the liquid and an accommodating portion in which the backpressure application member is accommodated, the accommodating portion having an upper wall that is positioned higher than an upper wall of the liquid storage portion, and wherein the backpressure application member has a portion that is positioned higher than an outer surface of the upper wall of the liquid storage portion and a liquid level of a maximum tolerable amount of the liquid storable in the tank body.

2. The replenishing-type liquid storage tank according to claim 1, further comprising an upper limit indicator set in the tank body and indicating the liquid level of the maximum tolerable amount of the liquid storable in the tank body.

3. The replenishing-type liquid storage tank according to claim 1, wherein the backpressure application member is made from a material capable of absorbing liquid.

4. The replenishing-type liquid storage tank according to claim 1, wherein the tank body comprises a liquid inlet port through which the liquid is replenishable, the liquid inlet port having a lower end, and wherein the portion of the backpressure application member is positioned equal to or higher than the lower end of the liquid inlet port.

5. The replenishing-type liquid storage tank according to claim 1, wherein the tank body comprises a wall constituting an outer shell thereof, the wall being provided with a liquid inlet port through which the liquid is replenishable, and wherein the portion of the backpressure application member is positioned equal to or higher than the wall at which the liquid inlet port is provided.

6. The replenishing-type liquid storage tank according to claim 1, wherein the tank body comprises a liquid inlet port through which the liquid is replenishable, the liquid inlet port having an upper end, and wherein the portion of the backpressure application member is positioned equal to or higher than the upper end of the liquid inlet port.

7. The replenishing-type liquid storage tank according to claim 1, wherein the upper wall of the liquid storage portion is provided with a liquid inlet port through which the liquid is replenishable.

8. The replenishing-type liquid storage tank according to claim 1, wherein the tank body comprises a liquid inlet port through which the liquid is replenishable, the liquid inlet port being positioned to be separated from the backpressure application member.

9. The replenishing-type liquid storage tank according to claim 1, further comprising a partitioning wall partitioning an internal space of the tank body into the liquid storage portion and the accommodating portion, wherein the liquid storage portion and the accommodating portion communicate with each other at a height equal to or below the liquid level.

10. An image-forming apparatus comprising:

the replenishing-type liquid storage tank according to claim 1; and a recording head configured to form an image on an image recording medium with the liquid supplied from the replenishing-type liquid storage tank.

11. The replenishing-type liquid storage tank according to claim 1, wherein the tank body comprises a liquid inlet port through which the liquid is replenishable, the liquid inlet port being provided at the upper wall of the liquid storage portion, and the liquid inlet port having an upper end, and wherein the upper wall of the accommodating portion is higher than the upper end of the liquid inlet port.

12. The replenishing-type liquid storage tank according to claim 11, wherein the portion of the backpressure application member is positioned equal to or higher than the upper end of the liquid inlet port.

13. The replenishing-type liquid storage tank according to claim 11, further comprising a cap for sealing the liquid inlet port, the cap being attachable to and detachable from the upper end of the liquid inlet port.

14. The replenishing-type liquid storage tank according to claim 2, wherein the upper limit indicator is in a shape of a line.

* * * * *